United States Patent [19]
Donahoe

[11] 3,836,193
[45] Sept. 17, 1974

[54] REPLACEABLE SURFACE WINDSHIELDS

[75] Inventor: John K. Donahoe, Long Beach, Calif.

[73] Assignee: McDonnell Douglas Corporation, Santa Monica, Calif.

[22] Filed: Apr. 2, 1973

[21] Appl. No.: 346,737

[52] U.S. Cl.............. 296/84 R, 52/616, 161/44, 161/192, 161/199
[51] Int. Cl................................................ B60j 1/06
[58] Field of Search............ 52/304, 616, 306–308; 161/44, 192, 199; 296/84 R, 91; 244/121

[56] References Cited
UNITED STATES PATENTS

| | | |
|---|---|---|
| 2,271,099 | 1/1942 | Schur.............................. 296/84 R |
| 2,409,808 | 10/1946 | Sowle.............................. 52/616 X |
| 2,784,926 | 3/1957 | Bonza.............................. 244/121 X |
| 3,679,527 | 7/1972 | Crick.............................. 165/5 |

Primary Examiner—Robert B. Reeves
Assistant Examiner—Thomas E. Kocovsky
Attorney, Agent, or Firm—Robert O. Richardson; Walter J. Jason; Donald L. Royer

[57] ABSTRACT

A windshield having a replaceable surface comprising a protective glass sheet having an optical coupling medium attached to the inner surface thereof which is contiguous with the outer surface of the windshield being protected. The optical coupling medium preserves the optical qualities of the assembly while bonded only to the protective shield layer and not to the windshield itself.

4 Claims, 2 Drawing Figures

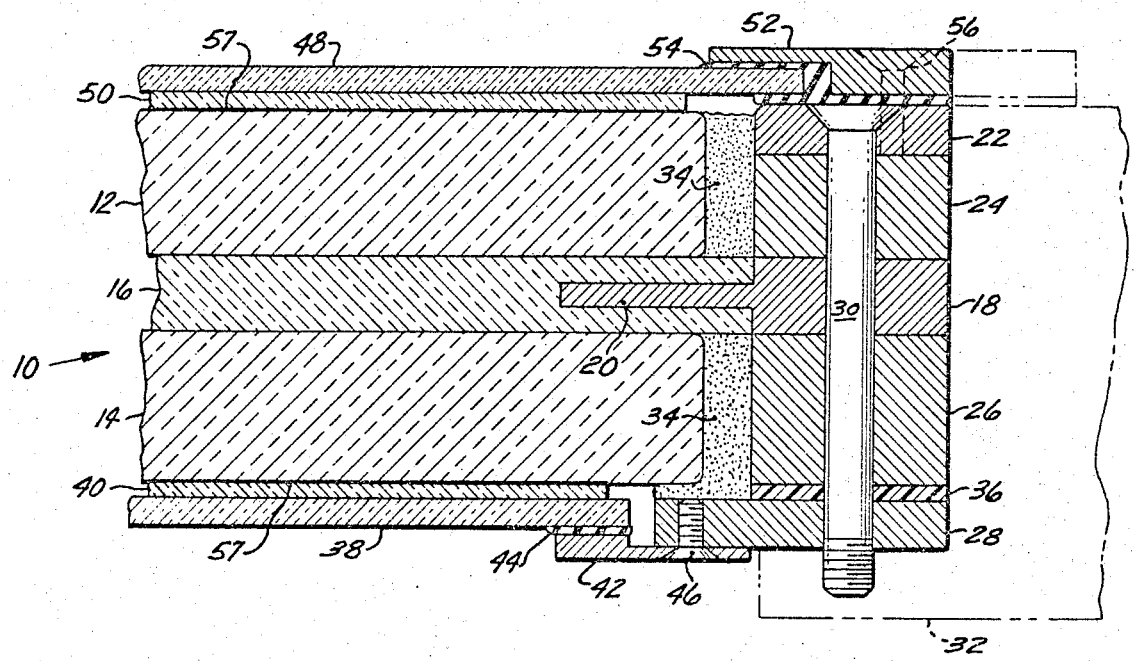

REPLACEABLE SURFACE WINDSHIELDS

BACKGROUND OF THE PRESENT INVENTION

Windshields for automobiles and aircraft usually consist of layers of glass bonded together with a transparent adhesive that holds the fragments when the glass breaks. This type of glass is normally called safety or shatterproof glass. Since this glass is an integral unit, any damage to one of its surfaces necessitates complete replacement of the whole unit. When this is done with windshields and cockpit windows on an aircraft, considerable time, labor and expense is involved.

Composite windshields in aircraft are subjected to stresses that cause delamination and other failure problems. Resulting stresses of flight and pressurization try to force the outer pane from the windshield. The bond is usually an interlayer of polyvinyl butyral (PVB) which is a soft gum-like material with relatively low adhesion and cohesion at temperatures of 60°F. and above. It also is thermally expansive. At lower temperatures it becomes more brittle with increased adhesion and cohesion. These properties produce a situation where the centally heated portion of the windshield with its heated PVB interlayer is forced outwardly while the cooler periphery of the windshield, surrounded by a good heat sink in the frame, remains rather rigid with a subsequent localization of stresses around the periphery of the windshield. This may cause delamination, cold chipping or spalling in the glass, weakening it so that it may fail under very light pressurization loads or stresses induced in the glass by heating the windshield.

U.S. Pat. No. 3,679,527 for Laminated Structures issued July 25, 1972 to R. D. S. Crick showing the concept of connecting rigid layers of windshield material through a layer of liquid or near liquid to prevent transmittal of shear loads between the rigid layers. However, such a layer has little or no cohesive (tensile) strength and subsequent fracture of the outer pane would result in the separation of the fragments into the airstream about the aircraft with possibility of damage to the fuselage.

SUMMARY OF THE PRESENT INVENTION

In accordance with the present invention an outer protective shield for the windshield is provided which "floats" over the structural or load bearing portion of the windshield with no bond between them. In addition to avoiding the stresses of prior windshields, this concept allows the shield to be replaced, when damaged, without the complexity of replacing the entire windshield. Optical coupling while permitting floating between the shield and windshield pane may be done with a silicone rubber adhesive applied to the inner surface of the shield, with an overlay of oil or plastic to prevent its adherence to the structural inner pane and to permit easier removal and replacement of the shield. The optical coupling medium is a true elastomeric material having fair to good cohesive strength (tensile strength —650 psi minimum). By being adhesively bonded to the shield, the probability of fracture-induced separation of outer shield fragments into the airstream with subsequent structural damage is greatly reduced.

BRIEF DESCRIPTION OF THE DRAWINGS

FIG. 1 is a sectional view of a portion of a windshield of glass structural members near one edge thereof; and FIG. 2 is a similar sectional view of a windshield of plastic structural members.

DETAILED DESCRIPTION OF ILLUSTRATIVE EMBODIMENT

Reference is now made to FIG. 1 wherein there is shown a portion of a windshield window 10 having two substantially rigid layers 12, 14 of transparent material such as tempered glass, for example, separated by a conventional interlayer 16 of a material such as PVB. This window has a frame including an edge attachment 18 having an insert 20 extending into the edge of interlayer 16. A plurality of spacers 22, 24, 26, 28 on both sides of edge attachment 18 complete the windshield package which is installed as a unit by means of a plurality of first fastening means such as screws 30 inserted from the outside and threaded into edge 32 of the aircraft window frame. Any suitable sealant 34 cushions the edge of glass layers 12 and 14 from the edge spacers 22, 24 and 26. A nylon/acrylic spacer 36 is positioned between spacers 26 and 28.

An inside replaceable surface 38 of glass having an optical coupling medium 40 is attached to a retainer frame 42 by an elastomeric adhesive 44. This frame fits within edge 32 of the aircraft window frame and is held in place against spacer 28 by a second removable fastening means such as screws 46.

An outside replaceable glass 48 having an optical coupling medium 50 on its inner surface is attached to an external retainer frame 52 by means of an elastomeric adhesive 54. This frame 52 is attached to spacer 22 by removable fastening means such as a plurality of screws 56. A portion of adhesive 54 forms a seal between spacer 22 and frame 52 but does not adhere to the spacer 22.

Optical coupling medium 40 adheres to the protective glass 38 but not to glass 14 of windshield 10. Similarly, optical coupling medium 50 adheres to glass 48 but not to glass 12. This no-bonding condition of the coupling medium to the structural windshield glass may be enhanced with a light coating 57 of a suitable liquid or suitable refractive index such as mineral oil, silicone oil, oil of balsam or other similar substance. A thin (0.005 inch) film overlay of Teflon FEP (Fluorinated Ethylene Polymer) on the coupling medium may also be used to prevent its adhesion to the windshield. It thus can be seen that the exterior protective surfaces of the windshield are isolated from the structural portions and may be replaced, when damaged, without having to replace the windshield itself.

The optical coupling mediums 40 and 50 are soft, fully cured, elastomeric materials such as a plasticized polyvinyl butyral (PVB), for example. In one application 100 parts of PVB mixed with 21 parts of tryglycol di (2 - ethyl butyrate), marketed as Flexol 3GH by Union Carbide Corporation has been used satisfactorily. In another application a solventless silicone elastomer such as the XR-63-489 resin system by Dow Corning was suitable.

FIG. 2 shows the application of the present invention when the structural members of the windshield are of plastic material. Here is shown a windshield 60 having stretched acrylic sheets 62, 64 with a PVB interlayer 66. The outer edge 68 of sheet 62 has been cut to a reduced thickness to accommodate a gasket 70 and spacer strip 72 through which a plurality of bolts 74 with countersink heads 76 may be inserted. The plastic sheets are drilled to receive the bolts 74 and do not require the sealant and spacer arrangement as with the glass windshield in FIG. 1. Ends 78 of bolts 74 threadedly engage the edge 80 of the aircraft windshield frame structure to retain the windshield 60 in place. When an inside surface protecting glass 82 and optical coupling medium 84 are used, an inner spacer 86 is added so that the retainer collar 88 may be fastened thereto by screws 90. In a manner similar to that in the embodiment in FIG. 1, the inner protective glass 82 is attached to retainer collar 88 with an elastometric adhesive 92.

The outer protective cover such as glass 94 has an optical coupling medium 96 bonded thereto. A non-adhesive film of oil 57 prevents its bonding to sheet 62. Cover 94 is also bonded to outer retainer frame 98 with an elastometric adhesive 100, a portion 102 of which serves as a gasket over spacer strip 72. The retainer frame 98 is fastened to spacer strip 72 by means of a plurality of screws 104 having countersink heads 106. Thus, the replacement of either inner cover 82 or outer cover 94 may be accomplished without removal of the windshield package which is held in place by bolt 74.

Having thus described an illustrative embodiment of the present invention, it is to be understood that modifications thereof will become apparent to those skilled in the art and that these deviations are to be construed as part of the present invention.

I claim:

1. A replaceable surface window comprising:
   a least, one pane of rigid transparent material forming a window,
   a frame having an edge to which said window is to be attached,
   first fastening means for attaching said window to said frame,
   spacer means held by said fastening means,
   a protective cover of rigid transparent material having an optical coupling medium bonded to one side thereof,
   said medium bearing against a surface of said window,
   said protective cover having a retainer frame over the edges thereof,
   removable fastening means attaching said protective cover and retainer frame to said spacer means whereby said protective cover and said retainer frame may be removed while said window remains attached by said first fastening means to said frame.

2. A replaceable surface window as in claim 1 wherein said spacer means is a strip about the periphery of said window and said first fastening means extends therethrough for attachment to said frame.

3. A replaceable surface window as in claim 1 wherein said optical coupling medium consists of plasticized PVB with a non-adhesive film on the medium surface bearing against said window pane.

4. A replaceable surface window as in claim 1 wherein a spacer is positioned between said edge and said window pane,
   a second protective cover with a second optical coupling medium bonded to one side thereof, said second optical coupling medium bearing on a second surface of said window,
   said second protective cover having a second retainer frame over the edges thereof, and
   a second removable fastening means attaching said second retainer frame to said spacer whereby said second protective cover may be removed while said window remains attached to said frame.

* * * * *